Patented Feb. 7, 1950

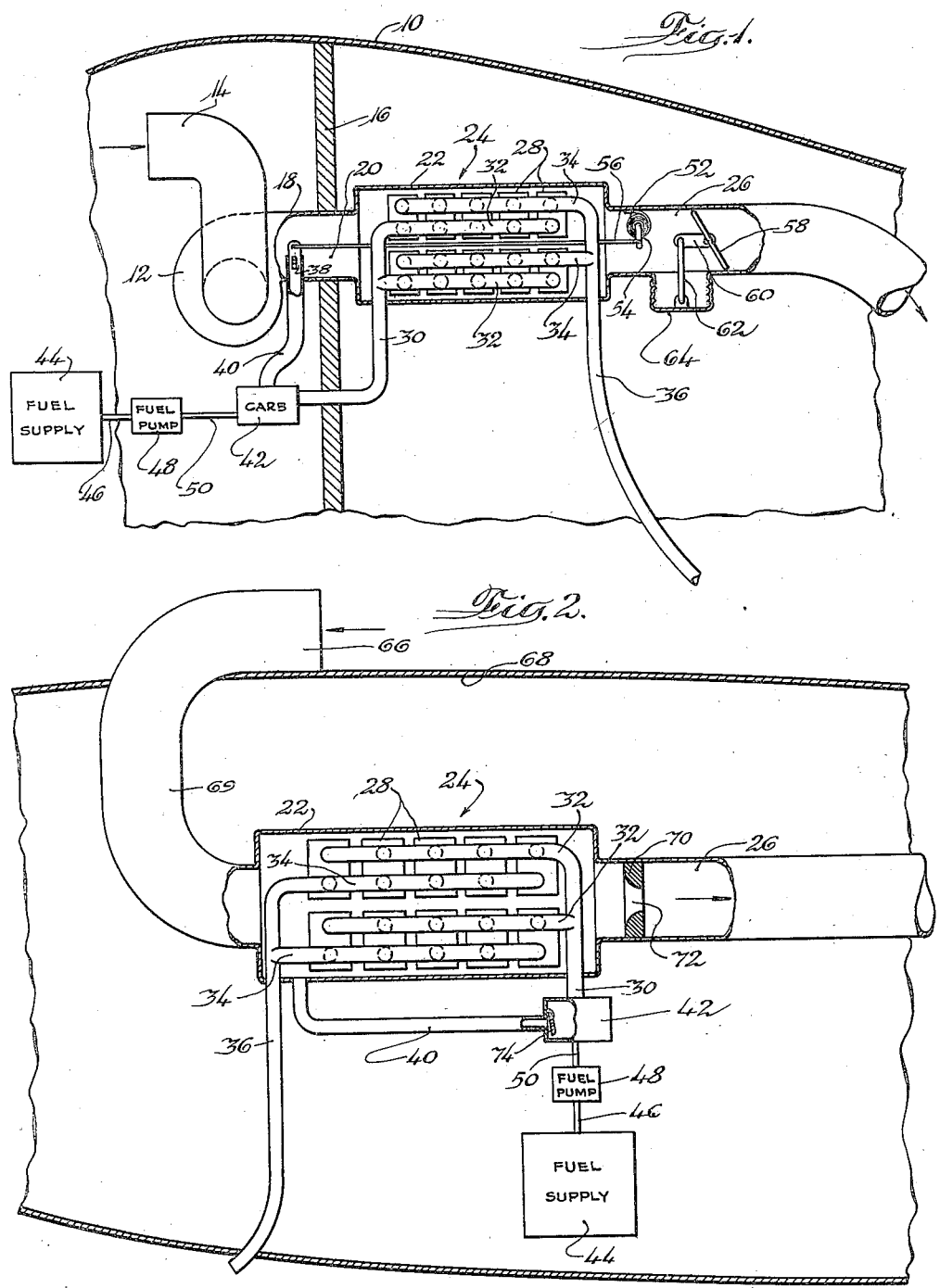

2,496,738

UNITED STATES PATENT OFFICE 2,496,738

HEATER

Henry J. De N. McCollum, deceased, late of Chicago, Ill., by Thelma McCollum, executrix, Chicago, Ill., assignor to Stewart-Warner Corporation, Chicago, Ill., a corporation of Virginia Original application January 15, 1943, Serial No. 472,458. Divided and this application November 5, 1945, Serial No. 626,684

5 Claims. (Cl. 237—2)

The invention relates generally to aircraft heating apparatus and more particularly to aircraft heaters in which combustion takes place within a sealed chamber. It will be appreciated that certain features of the invention are also applicable to heaters of other types, particularly heaters for automobiles and other mobile equipment.

This application is a division of application Serial No. 472,458, filed January 15, 1943, now Patent No. 2,427,221.

The design of aircraft heaters imposes several limitations not commonly encountered in heating equipment generally. The equipment should be kept as light and as small as possible and should have high heat output since, in general, the dissipation of heat from an aircraft is greater than is usually the case with heated spaces of comparable size.

It is one of the objects of the present invention to provide an improved aircraft or similar type heater which is light in weight, small in size and safe in operation.

A further object of the present invention is to provide a novel heater of the above type in which there is no direct communication between the combustion air side of the heater and the ventilating air side.

Yet another object of the present invention is to provide an improved aircraft or like type heater which is inherently safe even though the heat exchanger should crack or burn through while the heater is in operation.

Still another object of the present invention is to provide an improved aircraft or similar heater which carries out the above objectives under all flight and pressure conditions and at all airplane speeds.

Other objects and advantages will appear from the following description of a preferred embodiment of the invention which is illustrated in the accompanying drawings.

In the drawings in which similar characters of reference refer to similar parts throughout the several views:

Fig. 1 is a diagrammatic view of one form of the heating apparatus which utilizes a pressure responsive valve for controlling the ventilating air pressure in the heat exchanger. This heater is also equipped with a control for modulating the heat output according to demand; and Fig. 2 is a diagrammatic view showing a modified form of the invention in which air is supplied for combustion and for ventilating the heater by means of a ram or scoop in the air stream.

Prior to the present invention aircraft heaters of the combustion type were so built that a burnthrough or crack in the heat exchanger portion of the heating apparatus would be likely to result in products of combustion leaking from the combustion air space into the ventilating air, with the result that the air delivered to the cabin might be contaminated so as to render it unpleasant to the occupants and, under some conditions, unsafe. As has been pointed out previously, one of the important objects of this invention is to overcome this condition by the employment of heating apparatus so arranged that leaks in the heat exchanger portion of the apparatus result in ventilating air leaking through the heat exchanger to the combustion side. The result, of course, is that regardless of the condition of the heat exchanger the ventilating air cannot become contaminated with noxious products of combustion.

In general, this is accomplished by supplying the combustion side of the heater and the ventilating air side of the heater from the same source, or at least sources which vary together, so that any increase in pressure on the combustion side of the heater will be reflected by a similar increase of pressure on the ventilating air side. In addition to the above, the ventilating side of the heater is so arranged that the pressure drop from the point at which the pressures of the combustion air system and the ventilating air system are similar to the point where the ventilating air enters the heat exchanger involves relatively little pressure drop. Also, the downstream side of the heater may be equipped with a restrictor of one sort or another in the ventilating air to the end that the major portion of the pressure drop in the ventilating air system of the airplane takes place at a point downstream of the heater.

It is apparent that if the above precautions are carried out, the ventilating air compartment of the heater will always operate at a pressure well above atmospheric. By atmospheric is meant the pressure at the discharge point of the heater system on the ventilating air side, for instance, the aircraft cabin.

The combustion air side of the heater, on the other hand, is so arranged that the major portion of the pressure drop in the combustion air system occurs upstream of the point at which combustion takes place with the products of combustion flowing through passages of comparatively little pressure drop from the point of combustion to the exhaust outlet. Under these conditions, it will be seen that the combustion air side of the heater system from the point of combustion onwardly is always at a pressure state considerably below atmospheric and this is further enhanced by running the exhaust pipe through the wall of the airplane either in a location of low pressure or else in such manner that the dynamic effect of the air flowing over the airplane will produce a subatmospheric region at the exhaust outlet.

Referring specifically to Fig. 1 in which is illustrated an aircraft heater of simple type and the heating system is further illustrated rather diagrammatically since the invention is well adapted to this type of illustration, the heater as shown is installed in an aircraft nacelle with a cabin supercharging blower 12 and inlet 14 connected thereto arranged on the engine side of the fire wall 16. Although no aircraft engine has been shown, it will be appreciated that the inlet 14 should be so located that exhaust gases and other objectionable fumes from the aircraft engine are not picked up and fed to the aircraft ventilating system.

The outlet 18 of the blower leads to a ventilating air duct 20 which is connected to the ventilating air case 22 of the heater indicated generally by the numeral 24. The downstream end of the heater case is connected in turn to a ventilating air duct 26 which leads to the space to be heated.

Within the casing 22 is shown a plurality of heating units 28 which may be of the general type disclosed in the prior patent of Henry J. De N. McCollum and Thomas F. Spackman No. 2,236,789 granted April 1, 1941. These units 28 are supplied with a combustible mixture through a pipe 30 which leads to a pair of manifolds 32 connected to the combustible mixture inlets of the several heaters. The exhaust connections on the heaters communicate with a pair of manifolds 34 which lead to an exhaust pipe 36. The exhaust pipe should extend overboard of the airplane preferably in a position of low pressure or in such relation to the flowing air stream outside the airplane that a subatmospheric pressure is produced at the exhaust outlet.

Air for combustion is taken from the duct 18 through a combustion air regulator valve 38 to a combustion air pipe 40 which leads to a balanced type carburetor 42. The carburetor receives fuel, usually the same fuel supplied to the engine, from the fuel supply tank 44 which communicates through tubing 46 to a fuel pump 48 and thence by way of tube 50 to the carburetor.

Within the carburetor, combustion air flowing from the pipe 40 is mixed with liquid fuel delivered from the fuel supply to provide a combustible mixture and this mixture is delivered by the carburetor to the mixture pipe 30.

Somewhat downstream of the heater is shown a thermostatic helical bimetal element 52 which is responsive to the temperature of the air in the ventilating duct. It is connected by way of an arm 54 with a control rod 56 which leads to the valve 38. The control valve 38 and the control element 52 are not shown in detail since devices of this general nature for control purposes are well known. The arrangement is such that upon an increase in temperature in the ventilating air duct 26 above some predetermined level, the bimetal element 52 will move the rod 56 so as to increase the pressure drop through the valve 38. The result is that less air flows to the combustion side of the heater through the pipe 40. Inasmuch as the combustion air rate is reduced the carburetor supplies less fuel and therefore the heat output of the heating system decreases, thereby reducing the temperature in the ventilating air duct downstream of the heater so as to bring the system back into balance.

In order to insure a sufficient pressure at the combustion air pipe inlet to produce sufficient flow through the combustion side of the heater, a pressure responsive valve is located downstream of the heater. This valve comprises a butterfly damper 58 pivoted to rotate within the duct 26 from a fully closed position, as shown, to a more wide-open position in which it approaches an attitude more nearly parallel to the center line of the duct. This butterfly valve is connected by an arm 60 to a link 62 which in turn is attached to a sylphon type bellows element 64. The ventilating air pressure within the duct 26 is communicated to the bellows 64 in such manner that as the pressure rises the bellows element will elongate, thereby pulling upon the link 62 and tending to swing the damper toward open position. As the damper opens the pressure drop through the system decreases, thereby permitting the pressure within the duct 26 upstream of the damper to approach the cabin pressure. This decrease in pressure, of course, causes the sylphon bellows element 64 to move in the opposite direction, thereby causing the damper 58 to tend to reclose. The damper 58 and the associated control mechanism therefore insure a sufficient pressure differential between the outside air and the air at the heater to insure an adequate flow of combustion air through the valve 38, carburetor 32, and heating units.

From the above description it will be appreciated that at the point where the valve 38 receives combustion air from the ventilating air duct 18, the pressure of the combustion air and the ventilating air will be approximately equal. Further, it is apparent that at the outlet of the heating duct 26 the pressure will be substantially atmospheric and that similarly the outlet end of the exhaust pipe 36 will be atmospheric or somewhat less depending upon whether or not the outlet of the exhaust pipe is located in a region of subatmospheric pressure. It also will be seen that the principal point of pressure drop in the ventilating air system occurs at the damper 58 since this damper always produces a differential sufficient to cause combustion air to flow through the combustion side of the heater. It follows, therefore, that the pressure on the ventilating air side within the case 22 is well above the pressure of the ventilating air in the duct 26 downstream of the damper 58.

Although the ventilating air as just described flows comparatively freely through the heater up to the outlet thereof, the combustion air meets with a restriction at the valve 38 and at the carburetor 42 prior to arriving at the heating units 28. The combustible mixture pressure at the inlets to the heating units 28 is therefore below the pressure of the ventilating air within the case 22. The result is that if one of the heat exchangers of one of the units 28 should leak, the leakage will take place from the region of higher pressure to the region of lower pressure or, in other words, from the ventilating air side to the combustion air side.

In Fig. 2 is shown a modified form of the invention in which the heater 24 receives combustion and ventilating air from a ram or scoop 66 which extends outside the wall 68 of the aircraft and faces toward the direction of flight. Air entering the scoop 66 passes through a duct 69 to the inlet of the casing 22 of the heater 24, the outlet of the heater on the ventilating air side being connected to a ventilating air duct 26 leading to the space to be heated.

Since normally the pressure differential between the scoop 66 and the air in the cabin will not vary over as great a range as is common with the supercharged cabin illustrated in Fig. 1, the variable restriction illustrated by the damper 58 has been replaced by a fixed orifice plate 70 having an opening 72 therethrough for the passage of ventilating air. The orifice plate 70 serves as a sufficient restrictor in the ventilating system to insure that the pressure in the casing 22 will be well above atmospheric.

As in the previous embodiment of the invention, fuel is supplied from a tank 44 through a tube 46 to a pump 49 which feeds a balanced carburetor 42 through a pipe 50. The carburetor in turn receives air through a combustion air pipe 40 which opens into the heater case 22 in a position upstream of the plurality of heating units 28. The outlet of the carburetor 42 is connected by a mixture tube 30 to a pair of manifolds 32 leading to the heater mixture inlets. Similarly, also the heater exhaust outlets are connected to a pair of manifolds 34 which connect to an exhaust pipe 36 which extends overboard into an area of low pressure or into a trailing position as shown. In Fig. 2, the inlet to the carburetor has been provided with a check valve 74 so as to prevent reverse flow through the pipes 30 and 40 in the event that a starting explosion in the heater units 28 causes a momentary pressure rise. Under normal operating conditions the check valve 74 may not be necessary. Whether or not it is used will depend to a considerable extent upon the particular starting characteristics of the specific heaters used.

In the arrangement of Fig. 2 as in the previous embodiment illustrated in Fig. 1, the principal restriction in the ventilating air side of the system occurs downstream of the heater, whereas the principal restriction on the combustion side of the heater, that is, the carburetor 42, occurs ahead of the heating units 28. The result is that, as in the first embodiment, the pressure on the combustion air side of the individual heaters 28 is less than it is on the ventilating side, thus any leakage which takes place in the heat exchangers will produce a flow of ventilating air into the combustion air rather than in the reverse direction, thereby preventing the ventilating air from becoming contaminated by products of combustion.

Although two specific embodiments of the invention are shown, it should be appreciated that the important consideration in carrying out the invention is so to arrange the heater or heaters that the combustion air and ventilating air start flowing from a region of similar pressure, that the pressure drops in the two systems are such that combustion air reaches the point of combustion at a pressure lower than the ventilating air zone which is separated from the combustion air only by the heater structure. Further, it is apparent that this condition should persist throughout the heater, so that at any point from the zone where combustion starts to the point at which the combustion air flows from the heater, the ventilating air in the contiguous region always is maintained at a higher pressure, so that any leakage in the burner or heat exchanger will not result in the ventilating air becoming contaminated by the products of combustion.

Having described the invention, what is claimed as new and useful and desired to be secured by Letters Patent of the United States is:

1. In a heating apparatus for airplanes and the like, the combination of an internal combustion type heating unit assembly, a casing surrounding said assembly, a source of air under pressure, a conduit for supplying air from said source to said casing, a liquid fuel and air mixing device for supplying combustible mixture to said assembly, a conduit for supplying air from said source to said mixing device, an exhaust pipe for conveying the products of combustion from said assembly, a conduit for conveying heated air from said casing to the space to be heated, and means comprising a flow restriction in said last named conduit immediately adjacent said casing, said restriction means providing the major flow restricting element in said conduit and being constructed and arranged to maintain the pressure in said casing above the pressure in the interior of said assembly to prevent the products of combustion from leaking into the air being heated and to supply combustible mixture to said assembly under substantially all conditions of operation in the proper amount to heat the air to the desired temperature.

2. The combination set forth in claim 1 in which the flow restriction consists of a valve operated by means responsive to the pressure difference between the interior of said casing and the outside thereof to control the rate of flow of air through the conduit in which it is located.

3. In a heating apparatus for airplanes and the like, the combination of an internal combustion heating unit assembly, a casing surrounding said assembly, a source of air under pressure, a fuel and air mixing device supplying a combustible mixture to said assembly, a conduit for supplying air under pressure from said source to the inlet of said casing, a conduit connecting the outlet of said casing with the space to be heated to convey heated air thereto, a conduit for supplying air from said source to the inlet of said mixing device, a valve regulating the rate of flow of air through said last named conduit, thermostatic means, responsive to the temperature of said heated air, to operate said valve to decrease the rate of flow of air therethrough when said temperature exceeds a predetermined value, and to increase said rate of flow when said temperature decreases, a passage for conveying the products of combustion from said assembly, and means located in the outlet of said casing to maintain the air pressure therein above the pressure at the outlet of said passage.

4. In a heating system for an airplane or other conveyance having a supercharged cabin, and a blower for maintaining the air in said cabin at a higher pressure than the surrounding atmosphere, the combination of a casing connected to the outlet of said blower, an internal combustion operated heat exchange means within said casing, a duct connecting said casing with said cabin, and means in said duct for controlling the rate of air flow through said duct to maintain the air pressure within said casing sufficiently greater than the pressure within said heat exchange means to prevent leakage of the products of combustion therefrom to the air being heated.

5. The combination of an internal combustion heating unit assembly, a casing enclosing said assembly, a passage conveying heated air from said casing to the space to be heated, a device for mixing fuel and air to form a combustible mixture, a duct conveying combustible mixture from said device to said assembly, a duct conveying the products of combustion from said assembly, a source of air under sufficiently greater pressure than the outlet of said duct to operate said fuel and air mixing device and said assembly, a conduit connecting said source with the inlet of said device, a duct for supplying air from said source to the inlet of said casing, and means responsive to the temperature of the air flowing from said casing to control the rate of flow of air through said conduit.

THELMA McCOLLUM,
*Executrix of the Last Will and Testament of Henry J. De N. McCollum, deceased.*

REFERENCES CITED

The following references are of record in the file of this patent:

UNITED STATES PATENTS

| Number | Name | Date |
|---|---|---|
| 1,270,877 | Schulz | July 2, 1918 |
| 1,357,598 | Thompson | Nov. 2, 1920 |
| 1,839,880 | Hyatt | Jan. 5, 1932 |
| 2,119,402 | Puffer | May 31, 1938 |
| 2,205,451 | Woolery | June 25, 1940 |
| 2,353,112 | LaSha | July 4, 1944 |

OTHER REFERENCES

Magazine article, "Warm air system heats giant plane," pages 168, 169 and 170 of "Heating Piping and Air Conditioning" for March 1939.